United States Patent Office 3,594,124
Patented July 20, 1971

3,594,124
PROCESS FOR THE PREPARATION OF HYDROGEN
Gianfranco De Beni, Cadrezzate-Varese, Italy, assignor to European Atomic Energy Community (Euratom)
No Drawing. Filed Feb. 6, 1970, Ser. No. 9,399
Claims priority, application Netherlands, Feb. 19, 1969, 6902604
Int. Cl. C01b 1/03, 1/07, 13/04
U.S. Cl. 23—212                 2 Claims

ABSTRACT OF THE DISCLOSURE

Hydrogen is prepared by a cycle of chemical reactions which comprise the reaction of mercury with hydrogen bromide with the formation of mercury bromide and hydrogen, the reaction of the mercury bromide formed with an alkaline earth hydroxide with the formation of an alkaline earth bromide, mercury oxide and water, the decomposition of the resulting mercury oxide into mercury and oxygen and the hydrolysis of the resulting alkaline earth bromide with the formation of alkaline earth hydroxide and hydrogen bromide, and that the reaction products mercury, hydrogen bromide and eventually alkaline earth hydroxide are returned to the cycle.

---

The invention relates to a process for the preparation of hydrogen from water by means of a cycle of chemical reactions. A process of this kind is described in British patent specification No. 232,431. The most important reaction according to this specification is the heating of mercury vapour and steam to a temperature of about 360° C., whereupon hydrogen and mercury oxide should be formed. In practice, however, it has been found that this reaction does not take place, or at any rate does not take place to a sufficient degree. According to the above-mentioned specification, the mercury can be regenerated by heating the mercury oxide formed, whereupon it dissociates into mercury and oxygen.

The process according to the invention is based on a new cycle of chemical reactions whereby hydrogen can be prepared from water, while heat alone is used as an energy source.

The cycle according to the invention comprises the following reactions:

(1) The reaction of mercury with hydrogen bromide with the formation of mercury bromide and hydrogen:

$$Hg + 2HBr \rightarrow HgBr_2 + H_2$$

(2) The reaction of the resulting mercury bromide with an alkaline earth hydroxide with the formation of an alkaline earth bromide, mercury oxide and water. Although the reaction with calcium hydroxide is given as an example, the invention is not restricted to this. The cycle may also be carried out with the hydroxides of, for example, barium or strontium:

$$HgBr_2 + Ca(OH)_2 \rightarrow CaBr_2 + HgO + H_2O$$

(3) The decomposition of the resulting mercury oxide into mercury and oxygen:

$$HgO \rightarrow Hg + \tfrac{1}{2}O_2$$

(4) The hydrolysis of the resulting alkaline earth bromide (for example calcium bromide) with the formation of the corresponding alkaline earth hydroxide and hydrogen bromide:

$$CaBr_2 + 2H_2O \rightarrow Ca(OH)_2 + 2HBr$$

The reaction products mercury, hydrogen bromide and eventually alkaline earth hydroxide are returned to the cycle, whereby the latter is closed.

The heat required for the process according to the invention may be derived from a nuclear reactor, but other forms of heating may also be used.

The above four reactions have been carried out on a laboratory scale, when it was found that they all took place in the manner indicated. In a cyclic process all the starting materials that have not reacted completely are separated from the reaction products and returned to the cycle.

REACTION 1

This reaction may be carried out at a temperature of about 25° C. to about 300° C. The two starting products may be reacted with each other in liquid or in gaseous form. Working under raised pressure, when the starting products are liquid, has the advantage that the desired reaction product, hydrogen, can easily be separated from the reaction mixture. The hydrogen bromide may be used in the pure state or in aqueous solution. In the laboratory, in a closed reactor with a capacity of about 40 cm.$^3$, 0.15 cm.$^3$ of mercury is heated for two hours to 200° C. with 2.4 cm.$^3$ of a 48% by weight solution of HBr in water (specific gravity about 1.4). After cooling, the reactor contains hydrogen at a pressure of 2 atmospheres, mercury bromide in a proportion of 20% of the stoichiometric quantity, and unreacted mercury and hydrogen bromide, which latter may be used subsequently in the process. By drawing off hydrogen during the reaction, the yield of the reaction can be increased to practically quantitative quantities.

REACTION 2

In this reaction, it is preferable to operate in an aqueous medium at a temperature of 90–100° C. and in the presence of an excess of alkaline earth hydroxide of, for example, 20% by weight calculated on the stoichiometric quantity. As the alkaline earth hydroxide is consumed during the reaction, the excess dissolves in the water.

In the laboratory, 1 g. of mercury bromide was dissolved in warm water. A suspension of 0.2 g. of calcium hydroxide in water was added, and the mixture was boiled for a few minutes. The yield of mercury oxide was 100% of the theoretical. The oxide could easily be filtered off and only contained a small quantity of calcium hydroxide.

This reaction proceeds still better with barium hydroxide and strontium hydroxide, which are more readily soluble in water.

REACTION 3

At normal pressure, this reaction takes place at a temperature of 500 to 600° C. and practically quantitatively. If the mercury oxide still contains some calcium hydroxide from Reaction 2, this will remain behind as a residue, while the mercury formed can be condensed separately.

In the laboratory this reaction was carried out by heating mercury oxide in a tube provided with a trap for the condensation of the mercury vapour formed. The mercury oxide decomposed entirely at a temperature of about 550° C.

REACTION 4

This reaction is preferably carried out at a temperature of 600–750° C. and under raised pressure. This can be done by heating the starting products in a closed container. Alternatively, the alkaline earth bromide may be heated at normal pressure in a current of water vapour, and the water vapour may then be condensed to recover the hydrogen bromide.

In the laboratory, calcium bromide was heated to 730° C. in a quartz tube, and water vapour was led through the tube. The water vapour was condensed at the end of the tube, and after complete hydrolysis of the calcium bromide an aqueous solution of HBr of 3% by weight was obtained. This solution may be restored by distillation to a concentration that is suitable for reaction 1.

I claim:
1. A cyclic process for the preparation of hydrogen comprising the steps of:
 (a) reacting one mole of elemental mercury with two moles of hydrogen bromide at a temperature of about 25°–30° C. to produce $HgBr_2$ and hydrogen;
 (b) recovering the hydrogen;
 (c) reacting the resulting $HgBr_2$ in an aqueous medium and at a temperature of 90°–100° C. with an alkaline earth metal hydroxide to form the corresponding alkaline earth metal bromide, HgO and water;
 (d) decomposing the resulting HgO at a temperature of 500°–600° C. into elemental mercury and oxygen;
 (e) hydrolyzing the alkaline earth metal bromide to reform the alkaline earth metal hydroxide and to produce hydrogen bromide; and
 (f) recycling back into the process the reaction products of hydrogen bromide and mercury.

2. A process as claimed in claim 1, characterised in that the alkaline earth metal hydroxide is calcium hydroxide.

References Cited

UNITED STATES PATENTS 2,726,142   12/1955   Reeve _____ 23—154

OTHER REFERENCES

C. A. Jacobson: "Encyclopedia of Chemical Reactions", vol. 4, 1951 ed., p. 541, Reinhold Publishing Corp., New York.

J. W. Mellor: "A Comprehensive Treatise on Inorganic and Theoretical Chemistry", vol. 2, 1922, pp. 66–67, and vol. 4, 1923, page 882, Longmans, Green & Co., New York.

EDWARD STERN, Primary Examiner

U.S. Cl. X.R.

23—87, 90, 154, 210, 211

UNITED STATES PATENT OFFICE
CERTIFICATE OF CORRECTION

Patent No. 3,594,124     Dated July 20, 1971

Inventor(s) Gianfranco De Beni

It is certified that error appears in the above-identified patent and that said Letters Patent are hereby corrected as shown below:

Column 3, line 8, "30°C." should read -- 300°C. --.

Signed and sealed this 2nd day of May 1972.

(SEAL)
Attest:

EDWARD M. FLETCHER, JR.
Attesting Officer

ROBERT GOTTSCHALK
Commissioner of Patents